United States Patent
Michail

(10) Patent No.: US 10,049,437 B2
(45) Date of Patent: Aug. 14, 2018

(54) CLEARTYPE RESOLUTION RECOVERY RESAMPLING

(71) Applicant: MICROSOFT TECHNOLOGY LICENSING, LLC, Redmond, WA (US)

(72) Inventor: Ashraf Michail, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/357,277

(22) Filed: Nov. 21, 2016

(65) Prior Publication Data

US 2018/0144451 A1  May 24, 2018

(51) Int. Cl.
G06K 9/40 (2006.01)
G06T 5/20 (2006.01)

(52) U.S. Cl.
CPC ...... *G06T 5/20* (2013.01); *G06T 2207/10004* (2013.01); *G06T 2207/20024* (2013.01)

(58) Field of Classification Search
CPC ... G06T 15/503; G06T 15/005; G06T 11/001; G06T 11/40; G06T 5/20; G06T 2207/10004; G06T 2207/20024; G09G 5/363
See application file for complete search history.

(56) References Cited

U.S. PATENT DOCUMENTS

| 6,424,343 B1* | 7/2002 | Deering ............ G06T 5/20 345/419 |
| 7,199,807 B2 | 4/2007 | Kobayashi et al. |
| 7,545,389 B2 | 6/2009 | Proteau et al. |
| 8,325,177 B2 | 12/2012 | Lawrence et al. |
| 9,129,441 B2 | 9/2015 | Tine et al. |

(Continued)

FOREIGN PATENT DOCUMENTS

| AU | 2009243441 A1 | 6/2011 |
| WO | 0109736 A1 | 2/2001 |

OTHER PUBLICATIONS

Emori, et al., "Texture overlay onto deformable surface using HMD", In Journal of IEEE Virtual Reality, Mar. 27, 2004, pp. 221-222.

(Continued)

*Primary Examiner* — Ali Bayat
(74) *Attorney, Agent, or Firm* — Workman Nydegger

(57) ABSTRACT

ClearType resolution recovery resampling of source content is performed as the source content is transformed from a source presentation format to a destination presentation format by at least distinguishing between pixels of a bitmap corresponding to the source content that are ClearType pixels and pixels of the same bitmap that are non-ClearType pixels. Identification of ClearType pixels is performed by identifying Alpha values of pixels that are less than 1, by identifying high frequency color fringing of pixels and/or by explicit declarations in the bitmap. The bitmap is resampled by applying transforms, such as convolution filters, in selective and discriminating ways, such that, for example, the ClearType pixels of the bitmap are resampled/transformed on a subpixel granularity and the non-ClearType pixels of the same bitmap are transformed on a pixel granularity.

20 Claims, 8 Drawing Sheets

(56) References Cited

U.S. PATENT DOCUMENTS

| | | |
|---|---|---|
| 2002/0094119 A1* | 7/2002 | Sahadevan ............ G06T 7/0012 |
| | | 382/132 |
| 2003/0011618 A1* | 1/2003 | Deering ................... G06T 5/20 |
| | | 345/613 |
| 2003/0085906 A1 | 5/2003 | Elliott et al. |
| 2005/0134600 A1 | 6/2005 | Credelle et al. |
| 2005/0264588 A1 | 12/2005 | Brown Elliott |
| 2008/0297541 A1 | 12/2008 | Credelle |
| 2009/0249393 A1* | 10/2009 | Shelton ................. H04N 5/445 |
| | | 725/39 |
| 2012/0050275 A1 | 3/2012 | Matsui et al. |
| 2012/0293528 A1 | 11/2012 | Larsen |
| 2013/0021373 A1 | 1/2013 | Vaught et al. |
| 2013/0273968 A1* | 10/2013 | Rhoads ............. G06F 17/30244 |
| | | 455/556.1 |
| 2013/0335442 A1 | 12/2013 | Fleck et al. |
| 2014/0092998 A1 | 4/2014 | Zhu et al. |
| 2016/0093105 A1 | 3/2016 | Rimon et al. |
| 2016/0093108 A1 | 3/2016 | Mao et al. |

OTHER PUBLICATIONS

"GRC| How Sub-Pixel Font Rendering Works", Retrieved from <<https://web.archive.org/web/20161023143755/https://www.grc.com/ctwhat.htm>>,Jan. 19, 2018, 9 Pages.

"International Search Report and Written Opinion Issued in PCT Application No. PCT/US2017/061419", dated Feb. 5, 2018, 14 Pages.

* cited by examiner

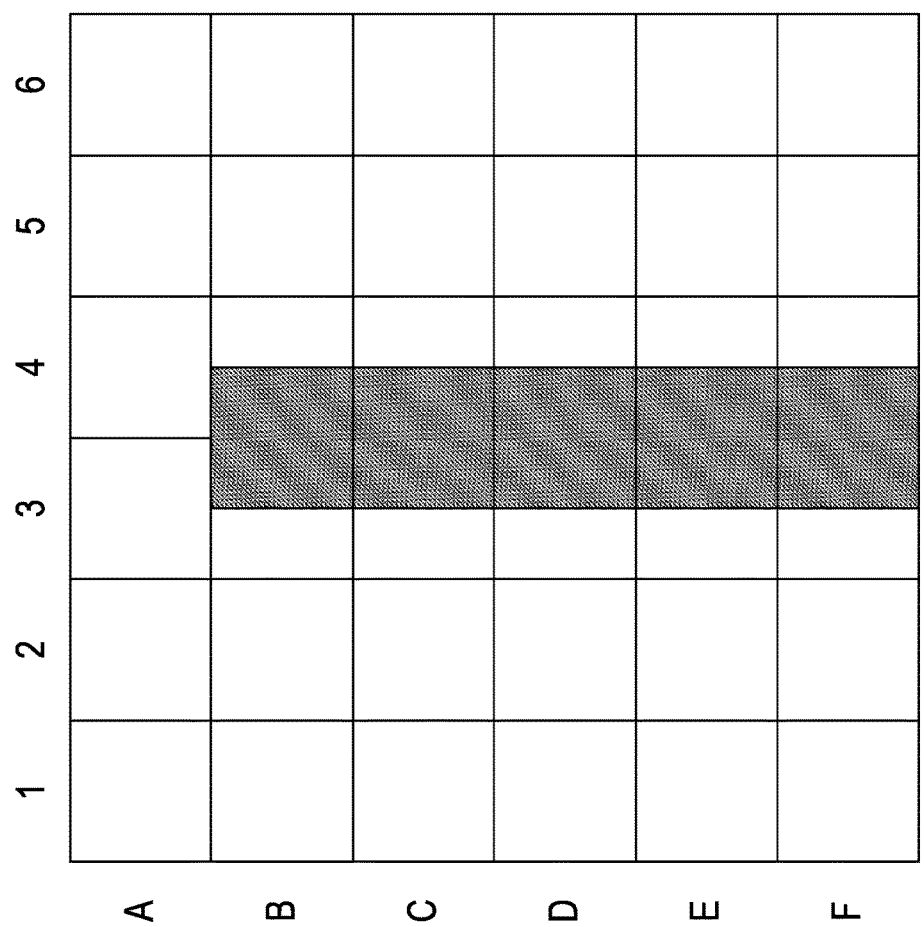

*Figure 2B*

CLEARTYPE RESOLUTION RECOVERY RESAMPLING

CROSS-REFERENCE TO RELATED APPLICATIONS

Background

Background and Relevant Art

Many applications are configured to present visual content to users, such as text and images. The formatting and overall presentation of the visual content can be controlled by the display attributes of the content, the rendering capabilities of the display devices, and the transformations that are applied for altering the presentation of the content.

For rendering, application source content is often rasterized into a bitmap that defines the pixel formatting and coloring information that is used for mapping the locations and colors of the source content pixels to the corresponding destination pixel locations and colors. Some bitmaps are referred to as texture maps, particularly when the bitmaps are applied to 3D spaces and objects.

Transformations are often applied to the bitmaps to cause the source content to be rendered into a different presentation than how it was originally provided. For instance, a transform can be applied for scaling the content, repositioning the content, skewing the angular perspective of the content, changing the resolution of the content, changing the transparency, texturing or coloring of the content, and so forth. These transforms can be applied during the initial rasterization process and/or during subsequent processing of the bitmaps prior to and/or during rendering of the content.

Some applications present source content that is configured for presentation in a mixed reality environment, such as AR (Augmented Reality) or VR (Virtual Reality). In such environments, the user is often changing their relative position corresponding to the rendered content, such as when the user moves or the AR/VR objects are moved within the mixed reality environment. Accordingly, the rendering engines have to alter the angular perspective/skew and/or size of the objects being viewed to provide a sense of realism to the objects. Imagine, for instance, a VR object comprising a page of text or other graphics that is text twisting and moving within a VR environment. The display engine will need to transform the positioning and size of the text/graphics to add the desired realism to the VR object.

It will be appreciated that content may undergo many transformations in order to prepare the content for presentation at the destination device in a desired format. Unfortunately, most of the transformations are inherently lossy and can result in blurring of the content and/or positional inaccuracies when rendering the content at the destination device. The transformations can also be computationally expensive. The foregoing is true, particularly in mixed reality environments and/or when the source content includes some ClearType graphics that are configured to be rendered on a subpixel granularity, as these situations can involve additional complexity and/or can require multiple transformations to be applied to the content. ClearType is an implementation of subpixel rendering technology that adjusts the intensity of the three different color sub-components of a pixel, namely, the red, green and blue subcomponents.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments are disclosed for performing graphics rendering and, even more particularly, for performing ClearType resolution recovery resampling of source content transformed from a source presentation format to a destination presentation format.

Some embodiments include distinguishing which pixels of a bitmap corresponding to the source content are ClearType pixels and which pixels of the same bitmap are non-ClearType pixels. Identification of the ClearType pixels is performed by identifying Alpha values of pixels that are less than 1, by identifying high frequency color fringing of pixels and/or by explicit declarations in the bitmap.

Embodiments also include resampling the content and/or by applying transforms, such as convolution filters, to bitmaps in selective and discriminating ways, such that, for example, the ClearType pixels of a particular bitmap are resampled/transformed on a subpixel granularity and the non-ClearType pixels of the same bitmap are transformed on a pixel granularity.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 2A-2D illustrates an example of a graphic being rendered on a 6×6 pixel grid with transformations and rendering changes being applied to the graphic as the graphic is shifted in pixel position;

DETAILED DESCRIPTION

Embodiments are disclosed for performing graphics rendering and, even more particularly, for performing ClearType resolution recovery resampling of source content transformed from a source presentation format to a destination presentation format.

Some embodiments include distinguishing which pixels of a bitmap corresponding to the source content are ClearType pixels and which pixels of the same bitmap are non-ClearType pixels. Identification of the ClearType pixels is performed by identifying Alpha values of pixels that are less than 1, by identifying high frequency color fringing of pixels and/or by explicit declarations in the bitmap.

Embodiments also include resampling the content and/or by applying transforms, such as convolution filters, to bitmaps in selective and discriminating ways, such that, for example, the ClearType pixels of a particular bitmap are resampled/transformed on a subpixel granularity and the non-ClearType pixels of the same bitmap are transformed on a pixel granularity.

As will be appreciated from the disclosure presented herein, the disclosed embodiments can be used to improve the positional accuracy and reduced blurring of content, particularly when that content must undergo transformations that involve subpixel transforms. Embodiments can also be used to quickly differentiate between ClearType content and non-ClearType content when performing transformations on the data, so as to provide a way for processing the ClearType content and non-ClearType content differently, which is particularly valuable when a single image contains both types of content.

The term ClearType refers to Microsoft's pixel rendering technology that treats the three different color subcomponents of a pixel separately. It will be appreciated, however, that the scope of this disclosure and the claims is not limited to the use of ClearType technology. Instead, this disclosure and the claims apply to any technology that treats pixel rendering/transformations on a subpixel basis, such that, in some embodiments, the term ClearType is replaceable by the term subpixel or subpixel rendering technology, or any other term that adequately represents the subpixels of the pixel being treated separately for rendering, based on the corresponding individual intensity values of the subpixels.

Figure 1:
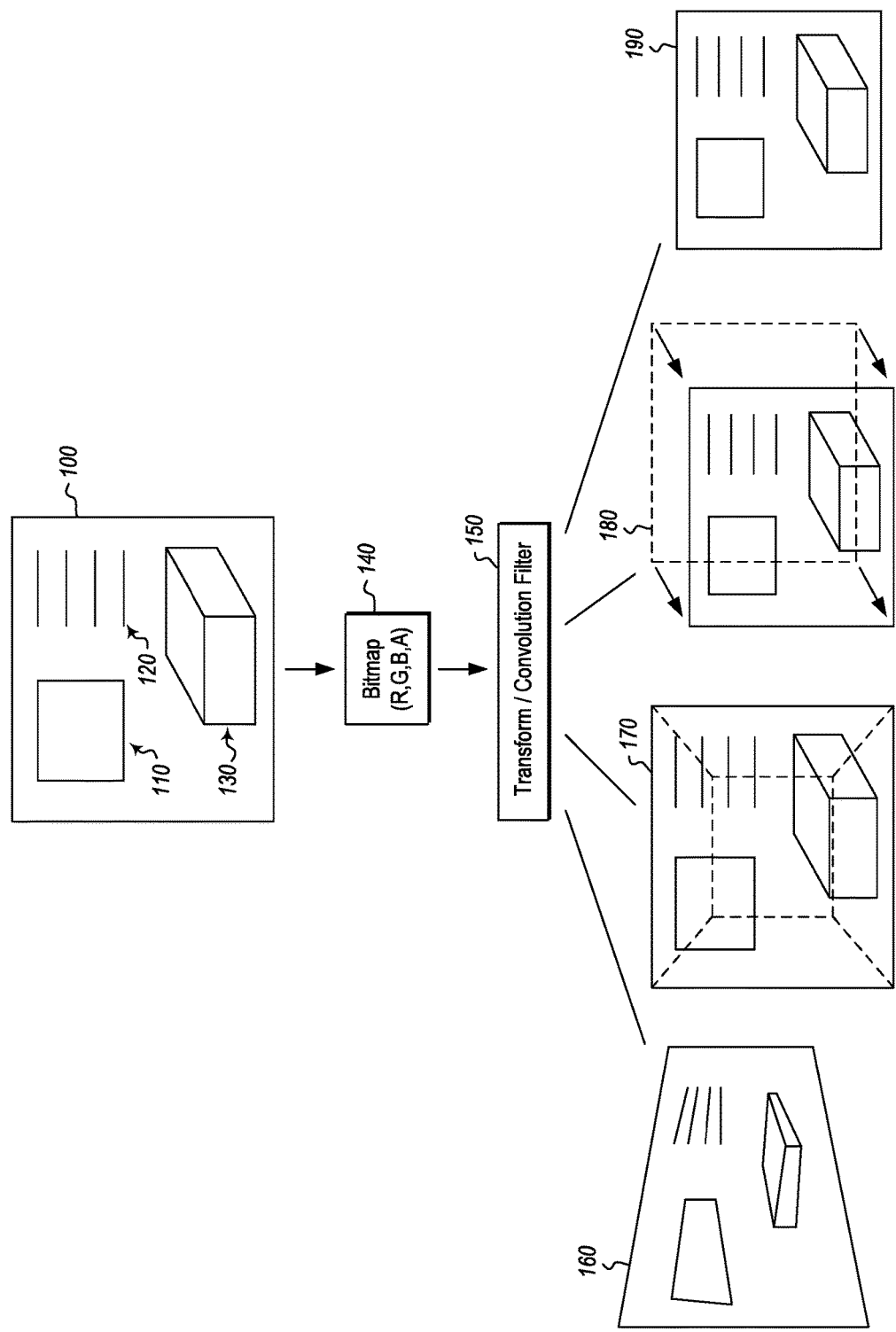
FIG. 1 illustrates an example of an application image comprising source content having a first/source presentation format being transformed into different/destination presentation formats.

Attention will now be directed to FIG. 1, which illustrates an example of an application image 100, comprising source content, being transformed from a first/source presentation format into different presentation formats. In this instance, the source content of the application image includes text 120 and non-text graphics, such as image 110 and 3D object 130. The image 100 is first transformed into a bitmap 140 representation of the image 100. This initial transformation is performed by a rasterizer and/or other computing elements. The bitmap 140 contains values and data that define the pixel structure and color values that represent and that are used to render the various pixels of the image 100. For instance, the bitmap 140 will define different color and intensity values for different pixels of the image. In some instances, the bitmap contains subpixel values (typically between 0 and 1) for each of a plurality of different image subpixel components. For instance, the bitmap may identify a red value, a blue value and a green value for each of a plurality of different pixels, wherein a value of 1 represents full intensity and a value of 0 represents zero intensity. The bitmap color values are usable to generate the resulting color pattern for the destination pixel. Spatial coordinates of the different pixels can also be identified in the bitmap, as well as an Alpha value corresponding to transparency for the pixel, wherein an Alpha value of 1 represents total transparency and a value of 0 represents total occlusion.

In some instances, the bitmap 140 will undergo transformations, such as performed by one or more convolution filters to cause the image to be mapped to a different geometric shape, resolution, relative position, color and/or other different format presentation. For instance, in FIG. 1, the image 160 represents as skewed angular presentation of image 100. This presentation (illustrated by image 160) may correspond to a perspective view of the image 100 in a virtual reality environment. Image 170 represents a scaled view of image 100, which occurs by zooming in or zooming out of the image 100. Image 180 represents image 100 with a different spatial location (e.g., shifted to the left). Image 190, which appears similar to image 100 is a higher resolution representation of image 100.

Each of the different image presentations (160, 170, 180 and 190) result from the application of one or more convolution filters or other transformations to image 100 and, more specifically, to the bitmap 140. Non-limiting examples of convolution filters include bi-cubic, bi-linear and Lanczos convolution transforms. Other convolution filters are well-known to those of skill in the art.

As indicated above, the transforms applied to the image during rasterization and/or during subsequent processing and rendering of the image can be computationally expensive and can be lossy, such that the resulting image may have reduced positional resolution and increased blurriness. This is particularly true when the image is being rendered with ClearType components and/or the image is being rendered in virtual reality. However, disclosed embodiment can be used to help mitigate these effects. Further descriptions regarding the impact of lossy transformations and the implications of performing transformations with ClearType (subpixel resolution) and non-ClearType (greyscale or pixel resolution) will now be described.

Figure 2B:
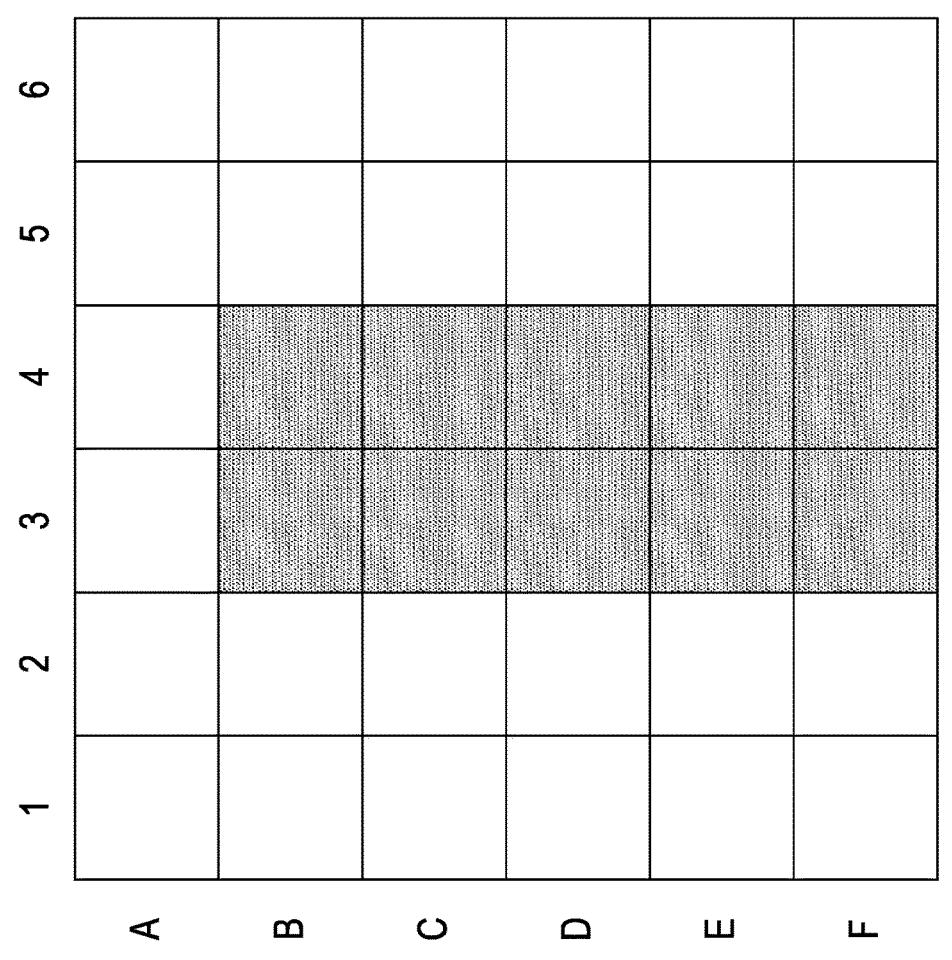

In FIG. 2A a 6×6 pixel grid is provided, with an image glyph being displayed on the pixel grid comprising a lowercase letter 'i.' This image corresponds to the color and spatial values defined by a bitmap for the glyph. In this example, the pixel has a height of five pixels and a width of one pixel. However, the pixel is defined by the bitmap as being rendered in the middle of two pixel columns (i.e., column 3 and 4). When rendered, this glyph will be displayed at a destination device with the resolution shown in FIG. 2B. In particular, the pixel intensity value defined by the bitmap for the source content of FIG. 2A indicates that each of the affected pixels corresponding to the glyph is only half covered. Accordingly, a greyscale resolution corresponding to a 50% coverage for each of these pixels will result in a full pixel display at 50% intensity. This is reflected by the illustration in FIG. 2B, where the glyph is now represented as being two pixels wide, but at half the contrast.

Figure 2C:
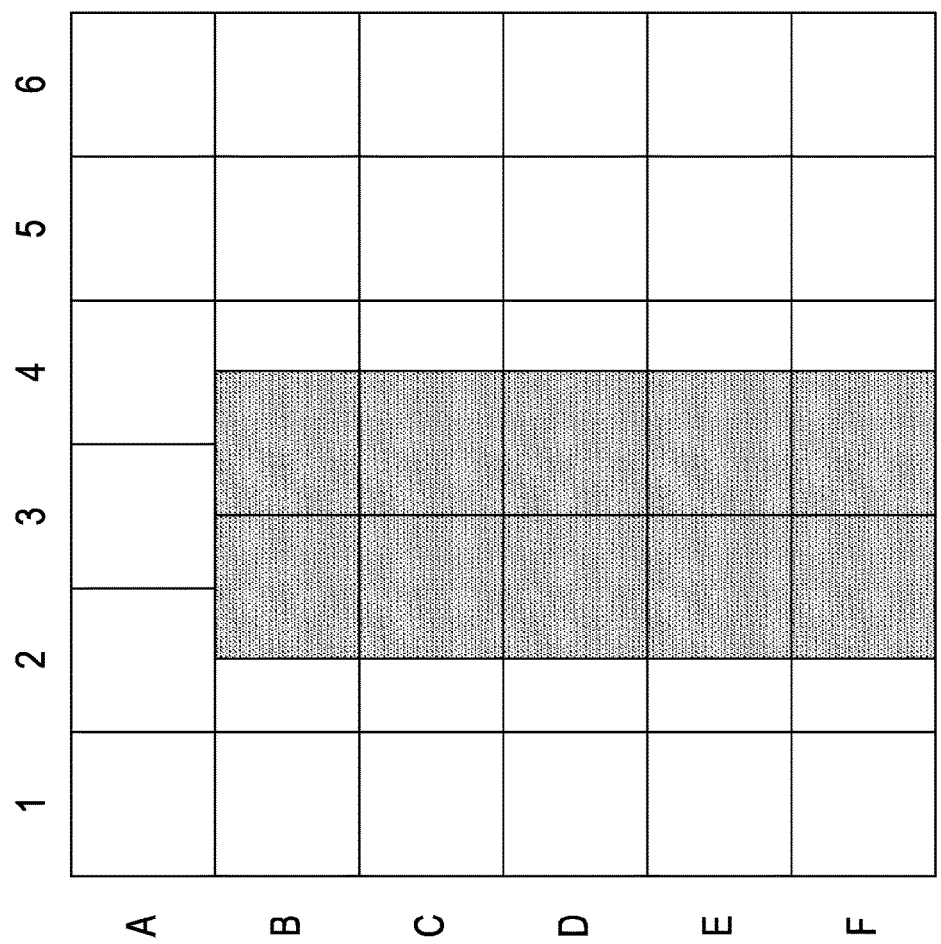
Figure 2D:
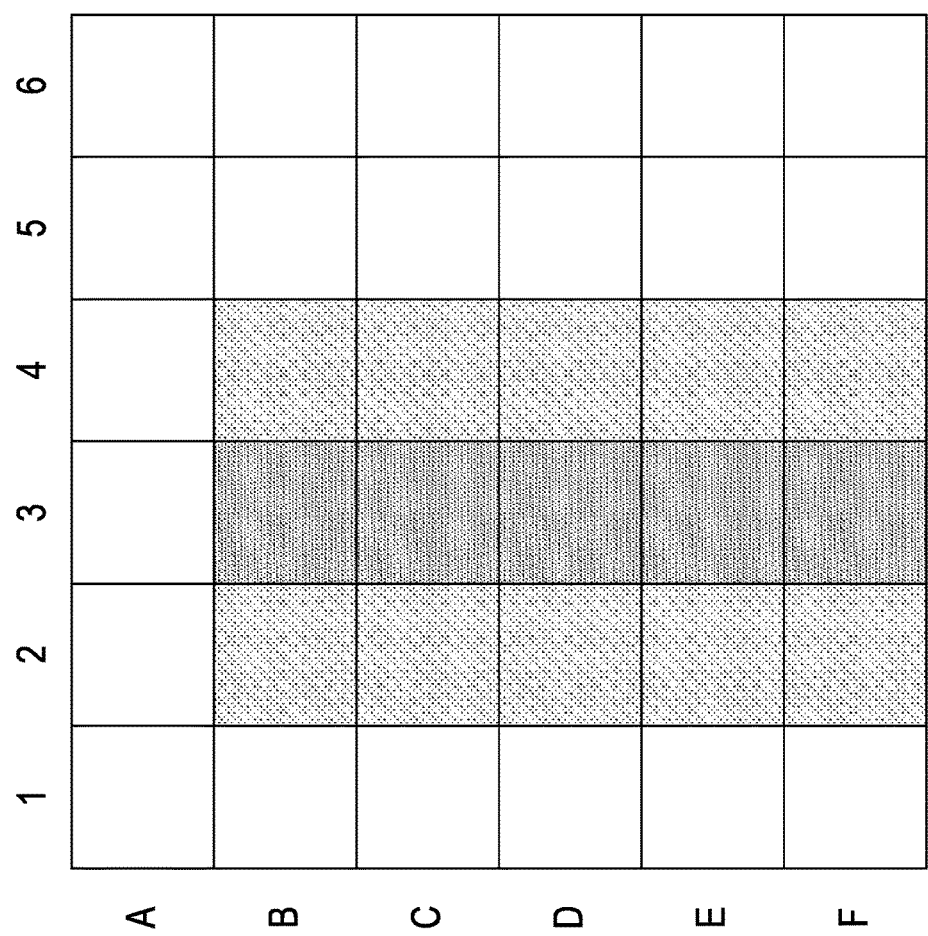

This blurring and loss of resolution is problematic and becomes even worse when further transformations are applied to the image, as described and shown with regard to FIGS. 2C and 2D. In 2D, the spatial positioning of the glyph has changed, shifting half a pixel to the left. For instance, if the bitmap 140 of FIG. 1 defined a position of the glyph at a first presentation position, but the transformation 150 caused the destination display position to shift left (e.g., as with image 180), a transformation would be applied to cause the shift. The resulting resolution of the image, however, may cause the image to be displayed with less positional accuracy and reduced contrast and resolution. For instance, by shifting the image to the left, as shown in FIG. 2C, the resulting display of the image would appear with the resolution shown in FIG. 2D, with the contrast of pixels in column 2 and 4 being 50% of the resolution of the pixels in column 3 for similar reasons as described above with regard to FIGS. 2A and 2B. Notably, the resolution of the glyph in FIG. 2D is significantly degraded from the original source image of FIG. 2A, resulting from the transformations applied to the image data.

Without providing a specific example, the foregoing problems and computational expense for performing transformations and for rendering transformed data can be even more extreme with ClearType and/or other subpixel computations/rendering. It can also be difficult and problematic to determine how to process an image when a single image contains some ClearType components and some non-ClearType components.

Figure 3:
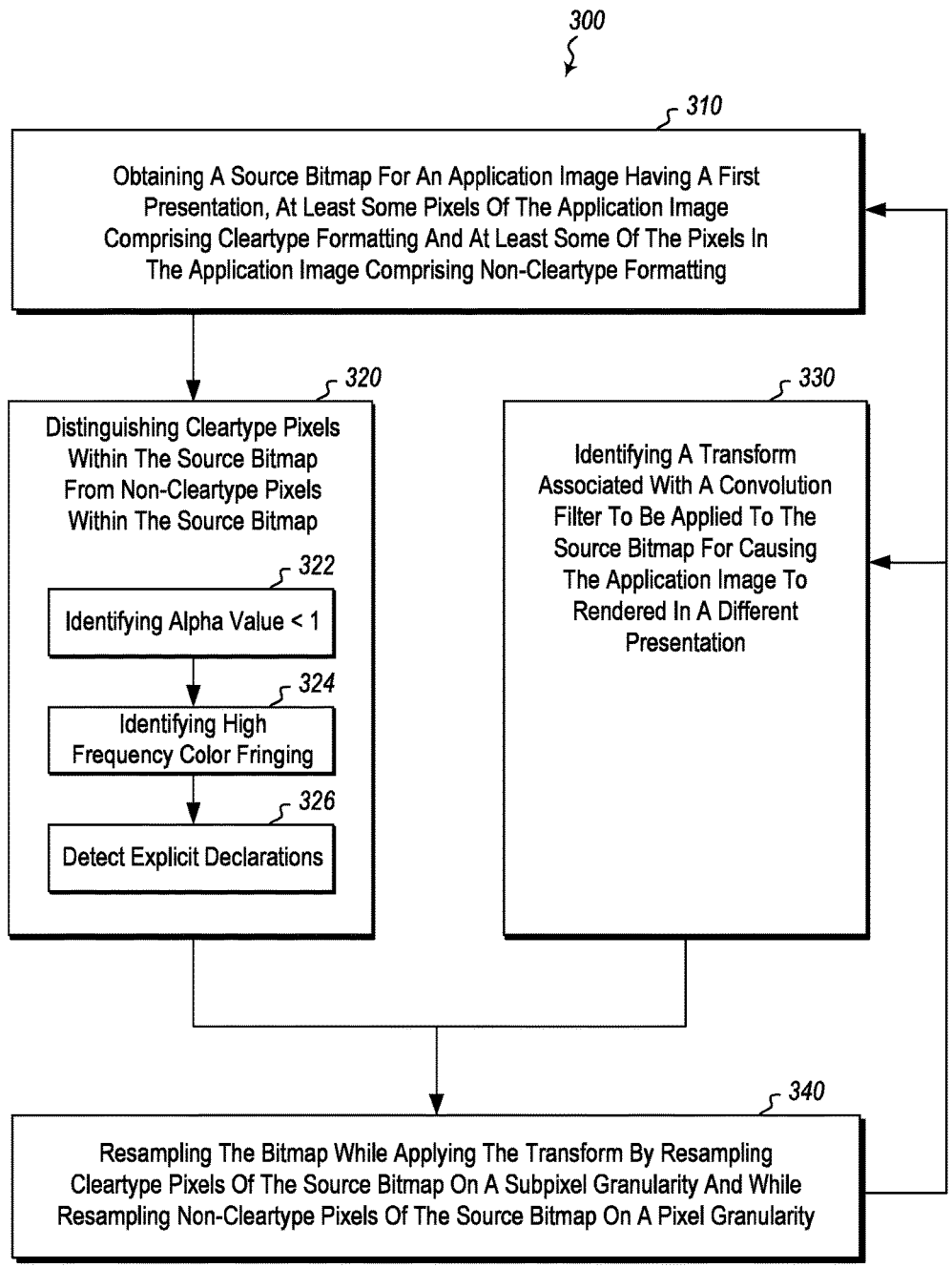
FIG. 3 illustrates a flow diagram associated with embodiments of the invention for performing graphics rendering and, even more particularly, for performing ClearType resolution recovery resampling of source content transformed from a source presentation format to a destination presentation format.

The current disclosure provides techniques for discovering ClearType components and for processing ClearType components in a discriminating way for images undergoing transformations from a first presentation to a new presentation. FIG. 3, for example, illustrates a flow diagram 300 associated with embodiments of the invention for performing graphics rendering and, even more particularly, for performing ClearType resolution recovery resampling of source content transformed from a source presentation format to a destination presentation format.

In FIG. 3, the flow diagram 300 includes various acts associated with methods for performing ClearType resolution recovery resampling. These acts include an act of obtaining a source bitmap for an application image having a first presentation format (act 310). This act can include a client computing system generating the bitmap that will be rendered by the client computing system, such as during a rasterization process. Alternatively, this may include obtaining the bitmap after it was already generated by another component or remote computing system. The image will, in some instances, include a plurality of pixels that are associated with ClearType components and a plurality of pixels that are associated with non-ClearType components, wherein the ClearType components can include text or non-text components. In other instances, all of the pixels defined by the bitmap are associated with ClearType components.

After the bitmap is obtained (act 310), the method includes distinguishing the ClearType pixels from the non-ClearType pixels within the source bitmap (act 320). This can be accomplished in various different ways, such as by identifying any pixels that are defined by an Alpha value of less than 1 (act 322), by identifying pixels associated with high color fringing (act 324) and/or by identifying explicit declarations of ClearType pixels in the bitmap headers or other bitmap fields (act 326). For embodiments in which the distinguishing the ClearType pixels is performed by identifying pixels that are defined by the Alpha value of less than 1, it is fairly easy to parse the bitmap and evaluate the Alpha values, as they are typically positioned right next to the red, green and blue subcomponent values provided for ClearType resolution rendering. For embodiments in which the bitmap is evaluated for pixels having color fringing, it may be necessary to evaluate relative differences in color values provided by the pixel data.

Again, as mentioned above, the scope of this disclosure also applies to situations, in some embodiments, where the term ClearType is replaced by a more generic term representing subpixel resolution/rendering. Accordingly, each of the acts associated with the distinguishing of the ClearType pixels in the bitmap can also include distinguishing any pixels defined in the bitmap at a subpixel granularity from pixels defined in the bitmap at a pixel granularity, or even more broadly to distinguishing two or more different categories of pixels in the bitmap where each grouping of pixels has a different resolution of values and/or instructions for rendering the pixels with different resolutions.

The disclosed methods also include identifying one or more transform (act 330) to be applied to the source bitmap for causing the application image to be rendered in a different presentation format than it is defined by the source bitmap. The transform may be a bi-linear, bi-cubic, Lanczos or other convolution filter transform, and/or any other transform that is operable to change the presentation format of the application image, such as by changing a position, shape, color, resolution, skew, scale and/or other change to the presentation format.

The act of identifying the transform (act 330) may occur prior to or subsequent to the distinguishing of the ClearType pixels (act 320) and/or the obtaining of the bitmap (act 310).

Next, the system performs a resampling of the bitmap (act 340), which may include the application of one or more transform/convolution filter for repositioning, resizing, reshaping, changing resolution, changing coloring, and/or performing another transformation with the bitmap image data.

In some embodiments, the resampling performed for the ClearType or other pixels defined on a subpixel or first granularity is different than resampling performed for non-ClearType pixels or other pixels defined on a pixel or a second granularity. Even more particularly, the resampling may include resampling the source bitmap by at least applying the convolution filter(s) on a subpixel granularity (e.g., using the subpixel values) to the ClearType pixels while applying the convolution filter to the non-ClearType pixels of the source bitmap on a pixel granularity (e.g., using a single blended pixel value).

In some instances, the transform applied to the source bitmap creates a new transformed bitmap with new bitmap values and the resampling of the source bitmap includes obtaining source subpixel values from the source bitmap prior to applying the transform to create the transformed bitmap, such that the transform is applied using with the source subpixel values rather than with the new bitmap values from the new transformed bitmap.

Figure 4:
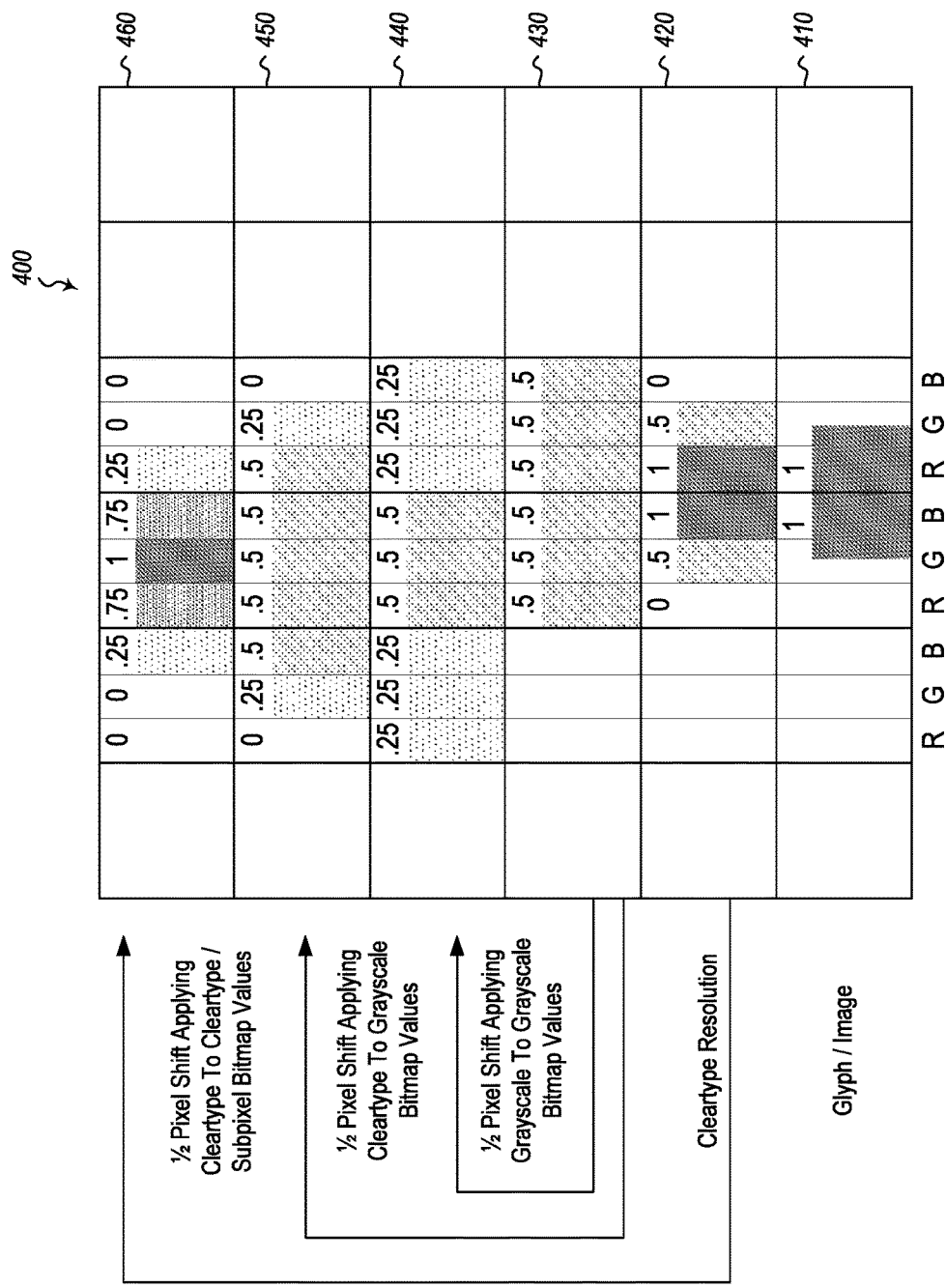
FIG. 4 illustrates differences for rendering graphics with grayscale and ClearType resolution and for altering the rendering based on transformations applied to the graphics.

An example of the foregoing will now be described with reference to FIG. 4. As shown, a pixel grid is presented with pixel rows 410, 420, 430, 440, 450 and 460, which are presented for illustration purposes only. Different portions of a glyph are shown, with different shading, for the different rows, corresponding to different stages of rendering the glyph and based on different granularities for rendering the glyph. The glyph in question is also undergoing a transformation of a shift in space, similar to the glyph transformation described in FIGS. 2A-2D.

In row 410, the glyph (comprising a width of one pixel) is positioned directly between two pixel columns, as in FIG. 2A. The pixel columns have been partitioned by their subcomponent colors (R-red, G-green and B-blue). This type of rendering corresponds to ClearType rendering or other subpixel rendering. If the glyph of FIG. 2A and row 410 of FIG. 4 was rendered according to ClearType rendering, it would be rendered similar to what is shown in row 420, with a 0 value intensity for the red subpixel, a 0.5 value or 50% intensity for the green subpixel and a 1 value or 100% intensity for the blue subpixel within the first shaded pixel of row 420. Similarly, the second pixel would have a 1 value or 100% intensity for the red subcomponent, a 0.5 value or 50% intensity for the green subpixel and a 0 value intensity for the blue subcomponent of the second shaded pixel in row 420. This would cause the first pixel to have a greenish/bluish color fringing and the right pixel would have a reddish/greenish color fringing. The color values for the subcomponents would be defined by the bitmap, along with an Alpha value that defines transparency for the ClearType component. Accordingly, a presence of any value under 1 can be used to identify the occurrence of a pixel associated with a ClearType component. Likewise, color fringing, such as associated with the example above can also be used to associate a pixel with a ClearType or other subpixel rendering component. In some instances, the bitmap may also include (within the header of pixel fields) one or more flags/declarations that identify a pixel as being associated with ClearType or another subpixel rendering component.

In contrast to the foregoing example, a grayscale or pixel granularity of the glyph in row 410 would be rendered according to the shading shown in row 430, corresponding to FIG. 2B.

Row 440 shows the resulting effect of displaying a transformed glyph from row 410 (or FIG. 2A) being shifted half a pixel to the left. The shading in row 440 corresponds to the illustration and description provided in reference to FIG. 2D. As discussed above, this can be less than desirable resolution for the resulting image.

One way to improve the positional accuracy and/or image resolution is to apply the transform on a subpixel granularity. However, due to lossy impacts of the transformation(s), even applications at the subpixel granularities can still have undesirable consequences. For instance, the shading of row 450 shows the net impact of applying the transformed grayscale pixel values associated with the bitmap or rendering of row 430 (which resulted from transforming the source bitmap values associated with row 410 into a grayscale bitmapping). As shown, the net impact is a further blurred/lower contrast shading than occurred in row 430, taking up two and a third pixels, rather than the two pixels coverage shown in row 430. The overall spread, however is less than the pixel spread in row 440, such that the positional placement appears to be better than for the image in 440.

According to some embodiments, the transformation and convolution filters are not applied to the transformed of the first shaded pixel, as discussed with regard to the image of 450, but are instead applied to the original subpixel values from the original/source bitmap prior to the transition occurring (e.g., the transition to the intermediary grayscale image in row 430). For example, the image of 460 shows the relative shading that occurs when applying subpixel granularity to the transition (which is a shift to the left by half a pixel in this case). By taking and applying the original bitmap values for the subpixels (e.g., from the bitmap for row 420) and then applying them to the shift, it is possible to obtain the higher resolution/contrast and positional accuracy (with a spread of 1 and two thirds pixel) shown in the image of row 460. This is significantly better than the resolution and positional accuracy provided by using pixel granularity (e.g., the grayscale pixel value corresponding to row 430).

While the foregoing example only described reference to a shift in position by a half a pixel, other transformations include skewing/stretching images or other shape changes, changing resolution, changing color and/or any other transformations. The corresponding convolution filters that are applied will also apply the transforms on a subpixel level, rather than a pixel level, such that the neighborhood of source subpixels will be resampled for the convolution performed on a subpixel basis for obtaining the destination subpixel(s), rather than sampling the neighborhood of source pixels, corresponding to a resulting destination pixel.

Figure 5:
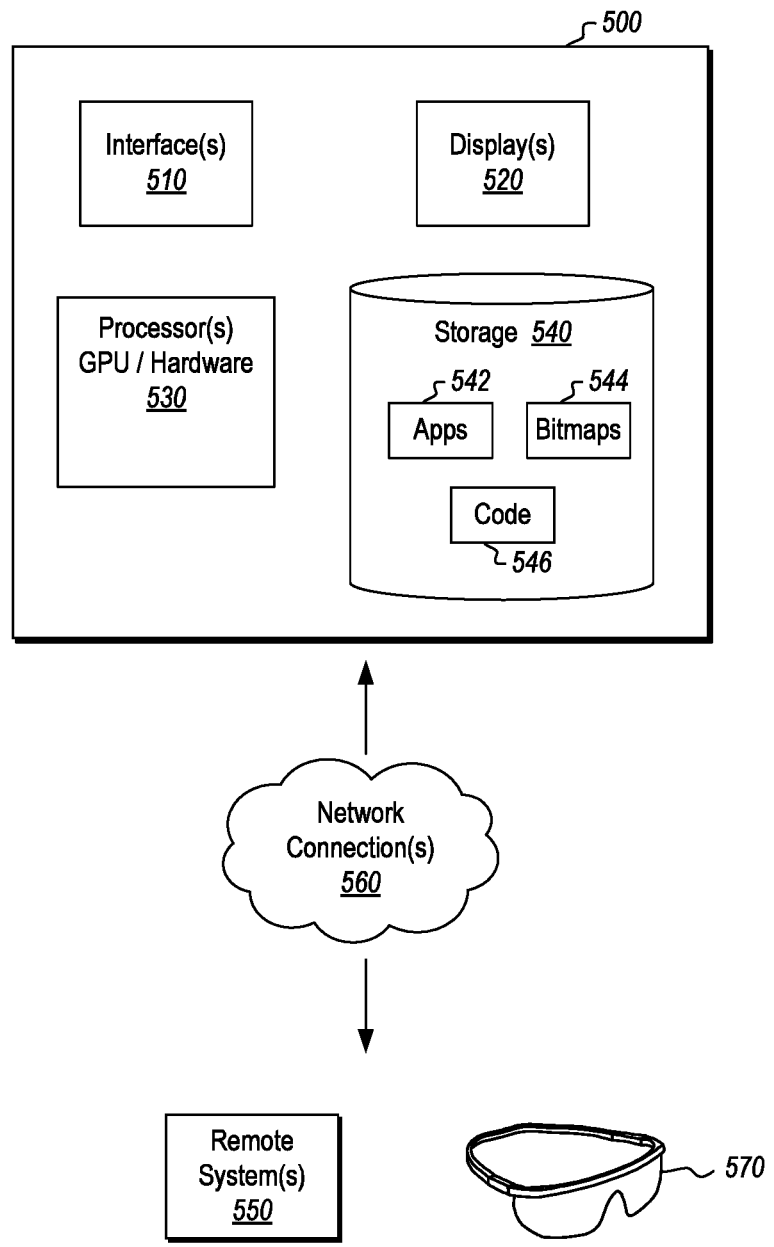
FIG. 5 illustrates one embodiment of a computing system environment which is usable for performing graphics rendering that includes performing ClearType resolution recovery resampling of source content transformed from a source presentation format to a destination presentation format.

Attention will now be directed to FIG. 5, which illustrates on suitable environment and computing system that can be used to implement aspects of the invention. As shown, the computing system 500 includes one or more interfaces that are operable to obtain user input and to provide output. These interfaces include hardware and software interfaces. Examples of software user interfaces include graphical user interfaces, text command line based user interface, function key or hot key user interfaces, and the like. The interfaces also facilitate communication between the other computing components, including display(s) 520, hardware processor(s) such as GPUs and other hardware components, as well as storage 540.

The storage may include any combination of volatile and non-volatile hardware storage that is operable to store the applications used to implement the invention and applications that are capable of generating the source images. The storage also contains the source, intermediary and transformed bitmaps, as well as the code for performing the transforms.

The computing system 500 utilizes the interface(s) 510 and hardware 530 to communicate with one or more remote system(s) 550 that may provide bitmaps and/or transform instructions, as well as one or more hardware display components like virtual reality component 570 that is operable to display a transformed image that was transformed by the computing system 500 according to the description provided herein.

Further, the methods disclosed herein may be practiced by other computing systems including special purpose or general-purpose computers, stand-alone or distributed computing systems, or any computer system having one or more processors and computer-readable media such as computer memory that stores computer-executable instructions that when executed by one or more processors cause various functions to be performed, such as the acts recited in the embodiments.

Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

The disclosed network connections are defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having computer-executable instructions stored thereon that are executable by the one or more processors to configure the computer system to implement a method for performing ClearType resolution recovery resampling of an application image that is being transformed from a first presentation to a different presentation including instructions that are executable to configure the computer system to perform at least the following:
      obtaining a source bitmap for the application image, at least some pixels of the application image comprising ClearType formatting and at least some of the pixels in the application image comprising non-ClearType formatting;
      distinguishing ClearType pixels within the source bitmap from non-ClearType pixels within the bitmap;
      identifying a transform associated with a convolution filter to be applied to the source bitmap for causing the application image to be rendered in a different presentation; and
      resampling the source bitmap while applying the transform by resampling ClearType pixels of the source bitmap on a subpixel granularity and while resampling non-ClearType pixels of the source bitmap on a pixel granularity.

2. The computing system of claim 1, wherein the method includes:
   distinguishing ClearType pixels within the source bitmap from non-ClearType pixels within the bitmap by at least examining the bitmap for pixels having an Alpha value that is less than 1 and by determining the pixels having the Alpha value that is less than 1 are ClearType pixels.

3. The computing system of claim 1, wherein the method includes:
   distinguishing ClearType pixels within the source bitmap from non-ClearType pixels within the source bitmap by at least examining the bitmap for pixels associated with high frequency color fringing and by determining the pixels associated with high frequency color fringing are ClearType pixels.

4. The computing system of claim 1, wherein the method includes:
   distinguishing ClearType pixels within the source bitmap from non-ClearType pixels within the source bitmap by at least examining the source bitmap for explicit declarations of pixels that are ClearType pixels.

5. The computing system of claim 1, wherein the transform and associated convolution filter are operable change a resolution of content in the application image from a first resolution associated with the first presentation to a different resolution associated with the different presentation.

6. The computing system of claim 1, wherein the transform and associated convolution filter are operable change a positioning of content in the application image from a first relative position within the first presentation to a different relative position within the different presentation.

7. The computing system of claim 1, wherein the method includes:
  resampling the source bitmap by at least applying the convolution filter on a subpixel granularity to the ClearType pixels while applying the convolution filter to the non-ClearType pixels of the source bitmap on a pixel granularity.

8. The computing system of claim 7, wherein applying the transform to the source bitmap creates a new transformed bitmap with new bitmap values and wherein the resampling the source bitmap includes obtaining source subpixel values from the source bitmap prior to applying the transform to create the transformed bitmap and such that the transform is applied using with the source subpixel values rather than with the new bitmap values from the new transformed bitmap.

9. The computing system of claim 7, wherein the convolution filter comprises a bi-linear convolution transform.

10. The computing system of claim 7, wherein the convolution filter comprises a bi-cubic convolution transform.

11. The computing system of claim 7, wherein the convolution filter comprises a Lanczos convolution transform.

12. The computing system of claim 1, wherein the method further includes:
  rendering the application image with the different presentation after the resampling, wherein the resampling transforms the application image from the first presentation to the different presentation.

13. The computing system of claim 8, wherein the rendering includes rendering the application image as a virtual reality object.

14. The computing system of claim 8, wherein the application image includes text graphics.

15. The computing system of claim 8, wherein the application image includes graphics other than text graphics.

16. A computer-implemented method for performing ClearType resolution recovery resampling of an application image that is being transformed from a first presentation to a different presentation, wherein the method includes a computing system performing the following:
  obtaining a source bitmap for the application image, at least some pixels of the application image comprising ClearType formatting and at least some of the pixels in the application image comprising non-ClearType formatting;
  distinguishing ClearType pixels within the source bitmap from non-ClearType pixels within the bitmap;
  identifying a transform associated with a convolution filter to be applied to the source bitmap for causing the application image to be rendered in a different presentation; and
  resampling the bitmap while applying the transform by resampling ClearType pixels of the source bitmap on a subpixel granularity and while resampling non-ClearType pixels of the source bitmap on a pixel granularity.

17. The method of claim 16, wherein the method includes:
  resampling the source bitmap by at least applying the convolution filter on a subpixel granularity to the ClearType pixels while applying the convolution filter to the non-ClearType pixels of the source bitmap on a pixel granularity.

18. The method of claim 17, wherein applying the transform to the source bitmap creates a new transformed bitmap with new bitmap values and wherein the resampling the source bitmap includes obtaining source subpixel values from the source bitmap prior to applying the transform to create the transformed bitmap and such that the transform is applied using with the source subpixel values rather than with the new bitmap values from the new transformed bitmap.

19. The method of claim 16, wherein the method includes distinguishing ClearType pixels within the source bitmap from non-ClearType pixels within the bitmap by at least examining the bitmap for pixels having an Alpha value that is less than 1 and by determining the pixels having the Alpha value that is less than 1 are ClearType pixels.

20. A computer program product comprising:
  one or more computer-readable hardware storage device having computer-executable instructions stored thereon that are executable by one or more processors of a computing system to configure the computer system to implement a method for performing ClearType resolution recovery resampling of an application image that is being transformed from a first presentation to a different presentation, including instructions that are executable to configure the computer system to perform at least the following:
    obtaining a source bitmap for the application image, at least some pixels of the application image comprising ClearType formatting and at least some of the pixels in the application image comprising non-ClearType formatting;
    distinguishing ClearType pixels within the source bitmap from non-ClearType pixels within the bitmap;
    identifying a transform associated with a convolution filter to be applied to the source bitmap for causing the application image to be rendered in a different presentation; and
    resampling the bitmap while applying the transform by resampling ClearType pixels of the source bitmap on a subpixel granularity and while resampling non-ClearType pixels of the source bitmap on a pixel granularity.

* * * * *